(12) United States Patent
Doglio et al.

(10) Patent No.: US 11,506,224 B1
(45) Date of Patent: Nov. 22, 2022

(54) ISOLATION OF A FAN CONNECTOR FOR VIBRATION REDUCTION

(71) Applicant: Dell Products L.P., Round Rock, TX (US)

(72) Inventors: Jean Marie Doglio, Round Rock, TX (US); Daniel J. Carey, Austin, TX (US); Paul Allen Waters, Austin, TX (US); Juan M. Gonzalez, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/501,177

(22) Filed: Oct. 14, 2021

(51) Int. Cl.
  *F04D 29/66* (2006.01)
  *F04D 29/64* (2006.01)
  *F04D 29/52* (2006.01)
  *G06F 1/20* (2006.01)

(52) U.S. Cl.
  CPC ......... *F04D 29/668* (2013.01); *F04D 29/522* (2013.01); *F04D 29/646* (2013.01); *G06F 1/20* (2013.01); *G06F 1/203* (2013.01)

(58) Field of Classification Search
  CPC .... F04D 29/522; F04D 29/646; F04D 29/668; G06F 1/20; G06F 1/203
  See application file for complete search history.

(56) References Cited

U.S. PATENT DOCUMENTS

| | | | |
|---|---|---|---|
| 7,186,075 B2 * | 3/2007 | Winkler | F04D 29/668 415/214.1 |
| 2011/0155344 A1 * | 6/2011 | Li | G06F 1/20 165/67 |
| 2018/0080480 A1 | 3/2018 | Doglio | |
| 2020/0100376 A1 * | 3/2020 | Lee | H05K 7/1492 |
| 2020/0318654 A1 | 10/2020 | Hsieh et al. | |

FOREIGN PATENT DOCUMENTS

JP      2005123429 A  *  5/2005
WO   WO-2017074351 A1  *  5/2017

* cited by examiner

*Primary Examiner* — Audrey B. Walter
(74) *Attorney, Agent, or Firm* — Larson Newman, LLP

(57) ABSTRACT

A fan carrier is to be placed in physical communication with a fan-side connector of an information handling system. The fan carrier includes a plunger assembly and multiple isolators. The plunger assembly is biased toward an at-rest position. The plunger assembly is in physical communication with the fan-side connector when the plunger assembly is in a deformed position. The isolators are mounted on the fan carrier, and dampen vibration energy in the fan carrier and prevent the vibration energy from being transferred to the fan-side connector. The isolators enable the fan-side connector to float within the fan carrier.

20 Claims, 4 Drawing Sheets

ISOLATION OF A FAN CONNECTOR FOR VIBRATION REDUCTION

FIELD OF THE DISCLOSURE

The present disclosure generally relates to information handling systems, and more particularly relates to isolation of a fan connector for vibration reduction in information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A fan carrier may be placed in physical communication with a fan-side connector of an information handling system. The fan carrier includes a plunger assembly and multiple isolators. The plunger assembly may be biased toward an at-rest position. The plunger assembly may be in physical communication with the fan-side connector when the plunger assembly is in a deformed position. The isolators may be mounted on the fan carrier, and dampen vibration energy in the fan carrier and prevent the vibration energy from being transferred to the fan-side connector. The isolators may enable the fan-side connector to float within the fan carrier.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
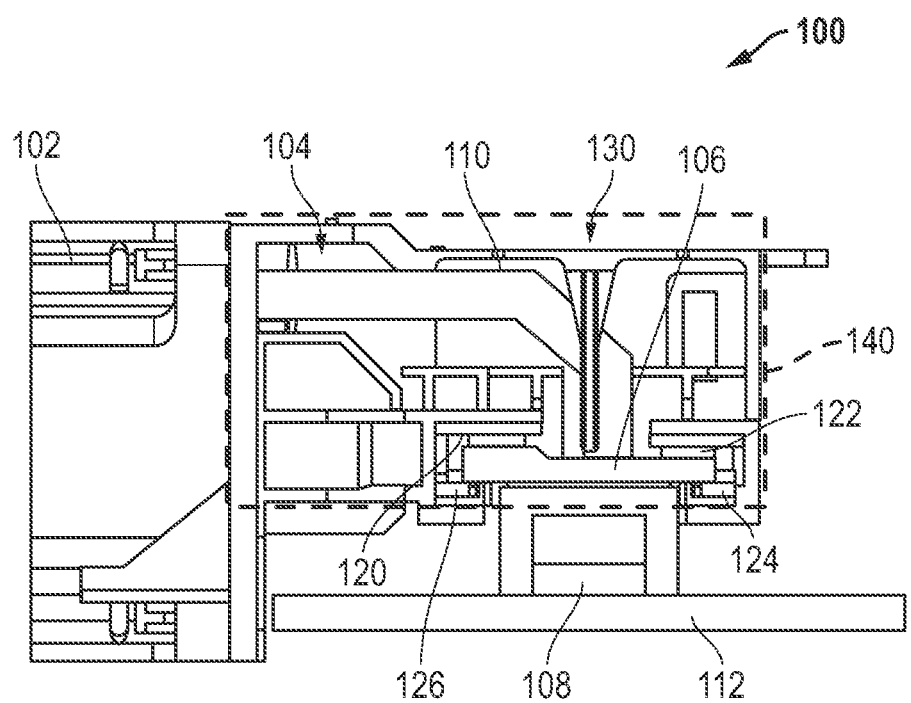
FIG. 1 is a front view of a fan coupled to a motherboard of an information handling system via connectors and a fan carrier according to at least one embodiment of the disclosure.

FIG. 1 shows a portion of an information handling system 100 including a fan 102, a fan carrier 104, a fan-side connector 106, a motherboard (MB)-side connector 108, cables 110, and a portion of a motherboard 112 according to at least one embodiment of the disclosure. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Information handling system 100 includes isolators 120, 122, 124, and 126 (120-126), each of which may be located between different portions of fan carrier 104 and fan-side connector 106. Fan carrier 104 includes a plunger assembly 130, which may be utilized while fan-side connector 106 is mated with MB-side connector 108 as will be described with respect to FIG. 3 below. In an example, motherboard 112 may control fan 102 via a communication path formed by MB-side connector 108, fan-side connector 106, and cables 110. One of ordinary skill in the art will recognize that while this disclosure discusses fan 102 and fan carrier 104 transmitting vibrations to fan-side connector 106, the disclosure may apply to any vibration source and an affected structure without varying from the scope of this disclosure. Fan 102 and fan carrier 104 may be referred to as a vibration source and fan-side connector 106 may be referred to as an affected structure.

In previous information handling systems, vibration energy from a fan would travel through the fan carrier and transfer to the fan-side connector. In this situation, the fan-side connector would vibrate relative to the MB-side connector, which in turn would fret and wear the pins/contacts between the connectors. In previous information handling systems, the fan would fail because of a communication loss between the motherboard and fan cause by the wear to pins/contacts between the connectors. Information handling system 100 may be improved by isolators 120-126 isolating fan-side connector from fan carrier 104. In an example, isolators 120-126 may dampen vibrations transmitted from fan 102 through 104 to prevent fan-side connector 106 from vibrating relative to MB-side connector 108. Information handling system 100 may also be improved by plunger assembly 130 improving the seating of fan-side connector 106 within MB-side connector 108.

In an example, wear on the pins/contacts of fan-side connector 106 and MB-side connector 108 may be based on any suitable factors including, but not limited to, a total normal load on the contacts, a sliding distance of the contacts, a hardness or softness of the contacting surface, and a number of oscillations. In certain examples, while all these factors may contribute to the wear of the contacts of fan-side connector 106 and MB-side connector 108, the wear may be proportional to the sliding distance between the contacts and a number of oscillations. In an example, the reduction of the sliding distance may minimize relative movement between fan-side connector 106 and MB-side connector 108. Isolators 120-126 may be utilized to reduce vibrations in fan-side connector 106, such that both the sliding distance and the number of oscillations experienced by the fan-side connector relative to MB-side connector may be reduced. The wear of contacts in fan-side connector 106 and the contacts in MB-side connector 108 may be reduced based on the reduction of the sliding distance and the number of oscillations.

Isolators 120-126 may be made of any suitable material to decouple fan-side connector 106 from fan 102 and fan carrier 104. For example, isolators 120-126 may be any low stiffness material with vibration damping properties including, but not limited to, an elastomer and foam. In an example, the affected structure or fan-side connector 106 may 'float' within fan carrier 104 so that the fan-side connector is not in physical communication with the fan carrier. If fan-side connector 106 was in physical communication with fan carrier 104, the vibration damping properties of isolators 120-126 would be bypassed and the vibration energy would be transferred from the fan carrier to the fan-side connector. To prevent the possibility of bypassing isolators 120-126, fan-side connector 106 may only in physical communication with the isolators and not with any other portion of fan carrier 104.

In an example, isolators 120-126 may be always in physical communication with fan-side connector 106 over a particular tolerance range. For example, isolators 120-126 may have a particular thickness to allow fan-side connector 106 to have a first thickness and the fan-side connector is still in a secure physical communication with the isolators. Additionally, the isolators 120-126 may enable fan-side connector 106 to have a second thickness and the isolators may still provide vibration damping. In an example, the first thickness of fan-side connector 106 may be the bottom of the tolerance range and the second thickness of the fan-side connector 106 may be the top of the tolerance range. In certain examples, if fan-side connector 106 is thicker than the top of the tolerance range, a compression force exerted on isolators 120-126 may be too great, such that the isolators may be too stiff and lose their vibration damping properties.

In certain examples, fan-side connector 106 and MB-side connector 108 may be a blind-mate assembly, such that an individual may not be able to see the alignment of the connectors when fan 102 and fan carrier 104 are mounted on motherboard 112. In this situation, plunger assembly 130 may be utilized to provide a reliable way to fully seat fan-side connector 106 within MB-side connector 108. For example, a force may be exerted on plunger assembly 130, and the force may cause the plunger assembly to be placed in physical communication with and provide a stiff backing for fan-side connector 106. When plunger assembly 130 is in physical communication with fan-side connector 106, the location of the fan-side connector within fan carrier 104 may be substantially constant to enable the fan-side connector to be fully seated within MB-side connector 108. In an example, plunger assembly 130 may be utilized to overcome the soft material of isolators 120-126 during the seating of fan-side connector 106 within MB-side connector 108 as will be described with respect to FIGS. 2 and 3.

Figure 2:
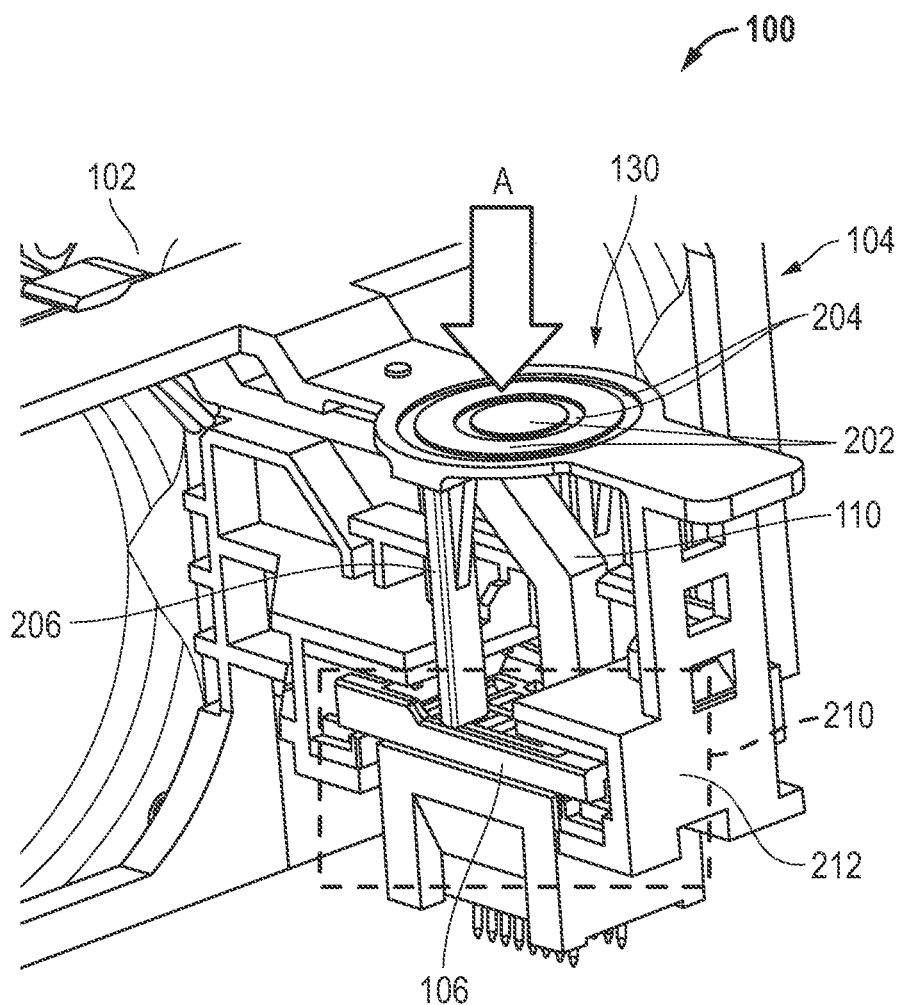
FIG. 2 is a perspective view of the connectors isolated from the fan carrier according to at least one embodiment of the present disclosure.

FIG. 2 illustrates a portion of information handling system 100 fan 102, fan carrier 104, fan-side connector 106, cables 110, and plunger assembly 130 according to at least one embodiment of the present disclosure. Plunger assembly 130 may be molded in any suitable manner to provide a spring-loaded plunger. For example, a top of plunger assembly 130 may include plastic portions 202 and soft compression portions 204. In this example, plastic portions 202 and compression portions 204 form a compression spring within plunger assembly 130. One of ordinary skill in the art would recognize that any other suitable arrangement may be utilized to create a compression spring within plunger assembly 130 without varying from the scope of this disclosure. Plunger assembly 130 further includes a plunger 206 to be placed in physical communication with fan-side connector 106.

In an example, plunger 206 may be located on an outer edge of plunger assembly 130 to enable cables 110 to be routed from fan-side connector 106 through a middle portion of fan carrier 104 to fan 102. Plunger 206 may be connected to any plastic portion 202 of the top of plunger assembly 130, such that the plunger may move in response to a force being exerted on the plunger assembly in the direction of arrow A. In an example, the compression portions 204 may bias plunger assembly 130 toward an at-rest position such that the top of the plunger assembly is not deformed from a substantially flat position. When the plunger assembly 130 is in the at-rest position, plunger 206 may be biased away from fan-side connector 106 so that a gap exists between the plunger and the fan-side connector. Deformation of plastic portions 202 and compression portions 204 to place plunger 206 in physical communication with fan-side connector 106 will be described with respect to FIG. 3.

Figure 3:
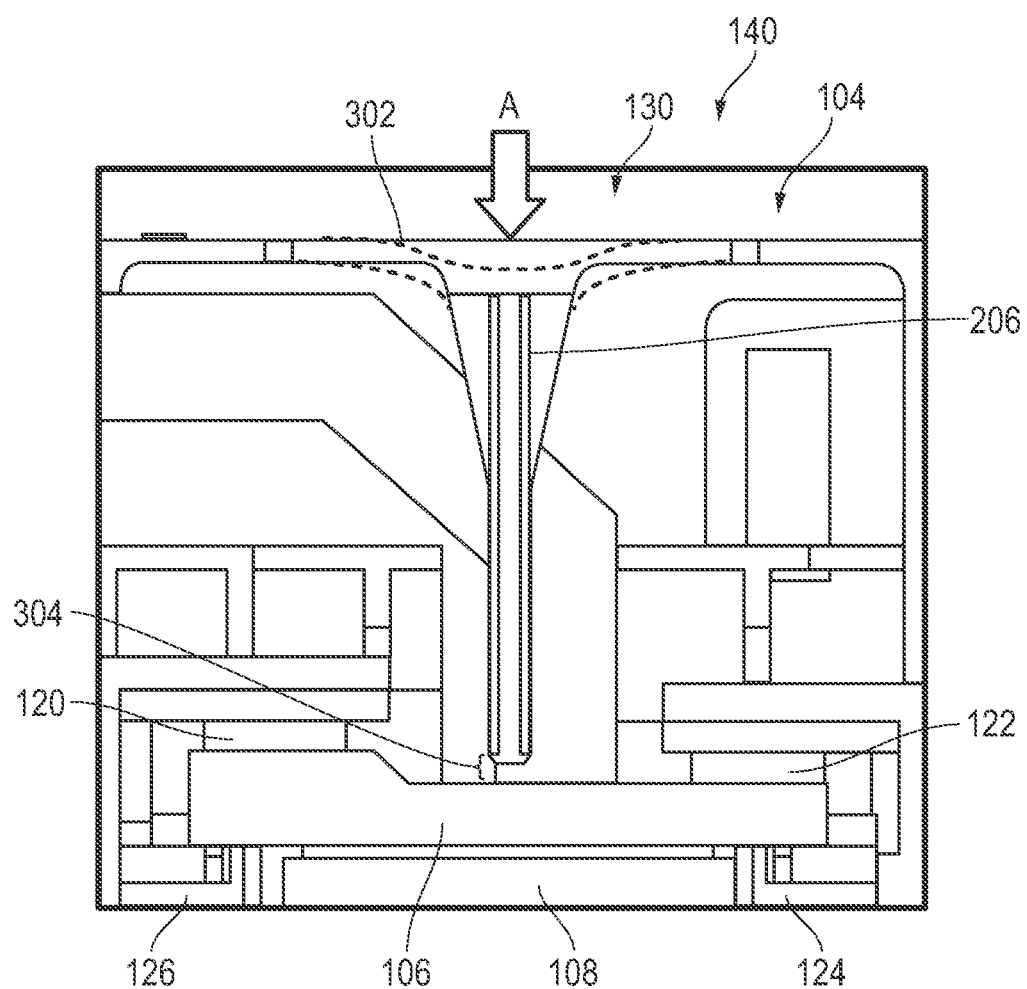
FIG. 3 is a front view of the connectors isolated within the fan carrier and of a seating plunger of the fan carrier according to at least one embodiment of the present disclosure.

FIG. 3 shows a portion 140 of fan carrier 104 of FIG. 1 according to at least one embodiment of the present disclosure. In an example, as a force is exerted downward on plunger assembly 130 in the direction of arrow A, a top portion of the plunger assembly may deform from a substantially flat at-rest position to a deformed position 302. As the top portion moves to the deformed position 302, plunger 206 may move downward toward fan-side connector 106 and close gap 304 between the plunger and the fan-side connector.

In an example, when plunger assembly 130 is in deformed position 302 and plunger 206 is in physical communication with fan-side connector 106, the plunger may provide a stiff backing for the fan-side connector to be fully seated within MB-side connector 108. In this example, plunger 206 may absorb any force exerted upward on fan-side connector 106 from MB-side connector 108 and the two connectors are mated together. Based on plunger 206 absorbing any force isolators 120-126 may substantially remain in a rest position with respect to fan-side connector 106.

When fan-side connector 106 and MB-side connector 108 are fully mated, the force exerted on plunger assembly 130 in the direction of arrow A may be released. In response to the force being released, a spring within plunger assembly 130 may move the plunger assembly back to the at-rest position, which may result in gap 304 existing between plunger 206 and fan-side connector 106. As stated above with respect to FIG. 2, the spring of plunger assembly 130 may be any suitable spring, such as a spring formed from plastic portions 202 and compression portions 204 of FIG. 2. In an example, during operation of an information handling system, plunger assembly 130 may be biased toward the at-rest position such that gap 304 prevents fan-side connector 106 from being in physical communication with fan carrier 104. In the at-rest position, any vibrations from fan carrier 104 may be damped by isolators 120-126 before the vibrations are transmitted to fan-side connector 106.

Figure 4:
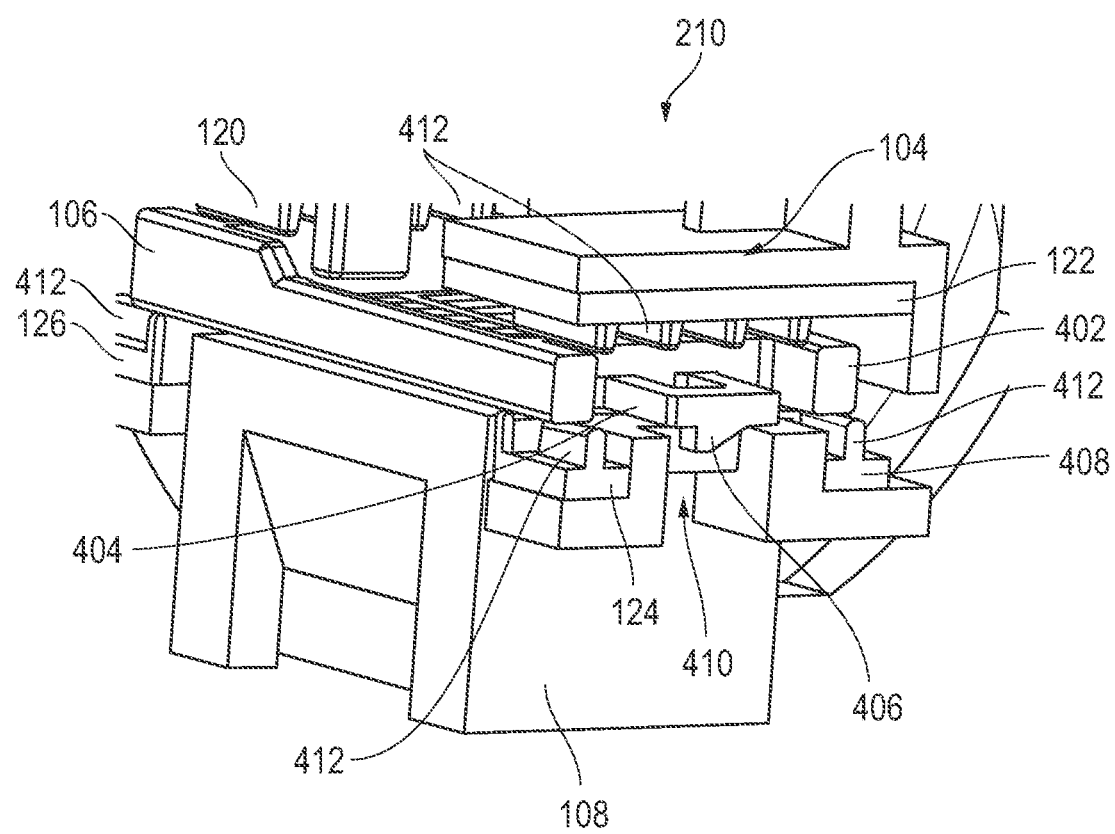
FIG. 4 is a perspective view of the connectors isolated within the fan carrier according to at least one embodiment of the present disclosure.

FIG. 4 illustrates a portion 210 of fan carrier 104 in FIG. 2 with a side wall 212 of the fan carrier removed to show a position of fan-side connector 106 with the fan carrier according to at least one embodiment of the present disclosure. Fan-side connector 106 includes a back portion 402, a retention portion 404, and a hook 406. As shown in FIG. 4, back portion 402 of fan-side connector 106 may be in physical communication with an isolator 408. Fan carrier 104 includes a retention gap 410 to receive hook 406 of fan-side connector 106.

In an example, isolators 120-126 and 408 may be mounted on fan carrier 104 in any suitable manner including, but not limited to, an adhesive located between each isolator and the fan carrier. As shown in FIG. 4, isolators 120-126 and 408 may extend beyond fan carrier 104 and are in physical communication with fan-side connector 106. In an example, isolators 120-126 and 408 may include any suitable portion, such as ribs 412, to contact both a side surface and a bottom surface of fan-side connector 106. Ribs 412 of isolators 120-126 and 408 may cause fan-side connector 106 to float within fan carrier 104, such that the fan-side connector is not in physical communication with the fan carrier. Each isolator 120-126 and 408 may have a particular thickness to ensure that fan-side connector 106 is always in physical communication with each of the isolators. For example, the thickness of each isolator 120-126 may result in a gap between top and bottom isolators to be slightly smaller than the thickness of fan-side connector 106 so that a slight interference is created between each of the isolators and the fan-side connector.

Ribs 412 of isolators 120-126 and 408 may reduce the stiffness of the isolators so that a force, such as the vibrations from fan 102, may be minimized. In an example, ribs 412 may be tall and narrow as compared to the remaining thin and flat portions of isolators 120-126 and 408. In this example, ribs 412 may deflect in response to a smaller amount of force than the remaining portions of isolators 120-126 and 408. Based on ribs 412 reducing the stiffness of isolators 120-126 and 408, the ribs of the isolators may create an effective amount of vibration isolation for fan-side connector 106.

As shown in FIG. 4, isolators 122, 124 and 408 may be positioned within fan carrier 104 to enable retention portion 404 and hook 406 to keep fan-side connector 106 within the fan carrier. In an example, as fan-side connector 106 is inserted within fan carrier 104, hook 406 on retention portion 404 may slip past a front edge of retention gap 410 of the fan carrier. Once fan-side connector 106 is located within fan carrier 104, hook 406 and retention gap 410 may ensure that the fan-side connector remains within the fan carrier. In an example, isolators 120-126 and 408 may be positioned to allow hook 406 to float within retention gap 410 and prevent contact or physical communication between fan carrier 104 and fan-side connector 106.

In an example, fan carrier 104 may include a gap to receive MB-side connector 108. The gap within fan carrier 104 may be sufficiently large to prevent MB-side connector 108 from being placed in physical communication with fan carrier 104 without isolators being located in between the MB-side connector and the fan carrier. The space between fan carrier 104 and MB-side connector 108 may prevent vibrations in the fan carrier from transferring to the MB-side connector. In another example, fan carrier 104 may include isolators located within the gap to interface with MB-side connector 108 to prevent vibrations in the fan carrier from transferring to the MB-side connector.

As stated above, isolators 120-126 and 408 may be utilized to reduce vibrations in fan-side connector 106, such that both the sliding distance and the number of oscillations experienced by the fan-side connector relative to MB-side connector 108 may be reduced. In an example, the wear of contacts in fan-side connector 106 and the contacts in MB-side connector 108 may be reduced based on the reduction of the sliding distance and the number of oscillations. Isolators 120-126 and 148 may be any low stiffness material with vibration damping properties and may cause fan-side connector 106 to float within fan carrier 104 so that the fan-side connector is not in physical communication with the fan carrier. In an example, when plunger assembly 130 is in deformed position 302 and plunger 206 is in physical communication with fan-side connector 106, the plunger may provide a stiff backing for the fan-side connector to be fully seated within MB-side connector 108. In this example, plunger 206 may absorb any force exerted upward on fan-side connector 106 from MB-side connector 108 and the two connectors are mated together.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A fan carrier to be placed in physical communication with a fan-side connector of an information handling system, the fan carrier comprising:
    a plunger assembly biased toward an at-rest position, the plunger assembly to be placed in physical communication with the fan-side connector when the plunger assembly is in a deformed position; and
    a plurality of isolators mounted on the fan carrier, the isolators to dampen vibration energy in the fan carrier and to prevent the vibration energy from being transferred to the fan-side connector, the isolators to enable the fan-side connector to float within the fan carrier.

2. The fan carrier of claim 1, wherein a first set of the isolators are positioned between the fan carrier and a top surface of the fan-side connector, and a second set of the isolators are positioned between the fan carrier and a bottom surface of the fan-side connector.

3. The fan carrier of claim 1, wherein the isolators extend beyond the fan carrier to hold the fan-side connector away from the fan carrier.

4. The fan carrier of claim 1, further comprising:
    a retention gap to hold the fan-side connector within the fan carrier, wherein the isolators hold a hook of the fan-side connector away from edges of the retention gap.

5. The fan carrier of claim 1, wherein the plunger assembly comprises:
    a spring to bias the plunger assembly toward the at-rest position; and
    a plunger in physical communication with the spring, the plunger to be placed in physical communication with the fan-side connector in response to a force being exerted on the plunger assembly to move the plunger assembly toward the deformed position.

6. The fan carrier of claim 5, wherein the spring is formed from a plurality of plastic portions and a plurality of compression portions within the plunger assembly.

7. The fan carrier of claim 5, wherein the plunger provides a stiff backing for the fan-side connector while the fan-side connector is mated with a motherboard-side connector.

8. An information handling system comprising:
    a fan;
    a motherboard to communicate with the fan via a motherboard-side connector, a fan-side connector, and a cable; and
    a fan carrier including:
        a plunger assembly biased toward an at-rest position, the plunger assembly to be placed in physical communication with the fan-side connector when the plunger assembly is in a deformed position; and
        a plurality of isolators mounted on the fan carrier, the isolators to dampen vibration energy in the fan carrier and to prevent the vibration energy from being transferred to the fan-side connector, the isolators to enable the fan-side connector to float within the fan carrier.

9. The information handling system of claim 8, wherein a first set of the isolators are positioned between the fan carrier and a top surface of the fan-side connector, and a second set of the isolators are positioned between the fan carrier and a bottom surface of the fan-side connector.

10. The information handling system of claim 8, wherein the isolators extend beyond the fan carrier to hold the fan-side connector away from the fan carrier.

11. The information handling system of claim 8, wherein the fan carrier further comprises:
    a retention gap to hold the fan-side connector within the fan chassis carrier, wherein the isolators hold a hook of the fan-side connector away from edges of the retention gap.

12. The information handling system of claim 8, wherein the plunger assembly comprises:
    a spring to bias the plunger assembly toward the at-rest position; and
    a plunger in physical communication with the spring, the plunger to be placed in physical communication with the fan-side connector in response to a force being exerted on the plunger assembly to move the plunger assembly toward the deformed position.

13. The information handling system of claim 12, wherein the spring is formed from a plurality of plastic portions and a plurality of compression portions within the plunger assembly.

14. The information handling system of claim 12, wherein the plunger provides a stiff backing for the fan-side connector while the fan-side connector is mated with the motherboard-side connector.

15. The information handling system of claim 12, wherein the plunger is positioned to enable the cable to extend from the fan-side connector through a middle portion of the fan carrier to the fan.

16. The information handling system of claim 12, wherein the plunger assembly moves toward the at-rest position when the force is removed.

17. An information handling system comprising:
a motherboard to communicate with a fan via a motherboard-side connector, a fan-side connector, and a cable; and
a fan carrier including:
a plunger assembly including:
a spring to bias the plunger assembly toward an at-rest position; and
a plunger in physical communication with the spring, the plunger to be placed in physical communication with the fan-side connector in response to a force being exerted on the plunger assembly to move the plunger assembly toward a deformed position; and
a plurality of isolators mounted on the fan carrier, the isolators to dampen vibration energy in the fan carrier and to prevent the vibration energy from being transferred to the fan-side connector, the isolators to enable the fan-side connector to float within the fan carrier, wherein a first set of the isolators are positioned between the fan carrier and a top surface of the fan-side connector, and a second set of the isolators are positioned between the fan carrier and a bottom surface of the fan-side connector.

18. The information handling system of claim 17, wherein the plunger provides a stiff backing for the fan-side connector while the fan-side connector is mated with the motherboard-side connector.

19. The information handling system of claim 17, wherein the plunger is positioned to enable the cable to extend from the fan-side connector through a middle portion of the fan carrier to the fan.

20. The information handling system of claim 17, wherein the plunger assembly moves toward the at-rest position with the force is removed.

* * * * *

UNITED STATES PATENT AND TRADEMARK OFFICE
CERTIFICATE OF CORRECTION

PATENT NO. : 11,506,224 B1
APPLICATION NO. : 17/501177
DATED : November 22, 2022
INVENTOR(S) : Jean Marie Doglio et al.

Page 1 of 1

It is certified that error appears in the above-identified patent and that said Letters Patent is hereby corrected as shown below:

In the Claims

Column 8, Line 39, Claim 11: Please change "fan chassis carrier" to --fan carrier--

Signed and Sealed this
Sixth Day of May, 2025

Coke Morgan Stewart
*Acting Director of the United States Patent and Trademark Office*